Feb. 15, 1955     E. A. SHERRILL     2,702,093
LUBRICATING SYSTEM FOR HIGH-SPEED MACHINES
Filed Oct. 21, 1949
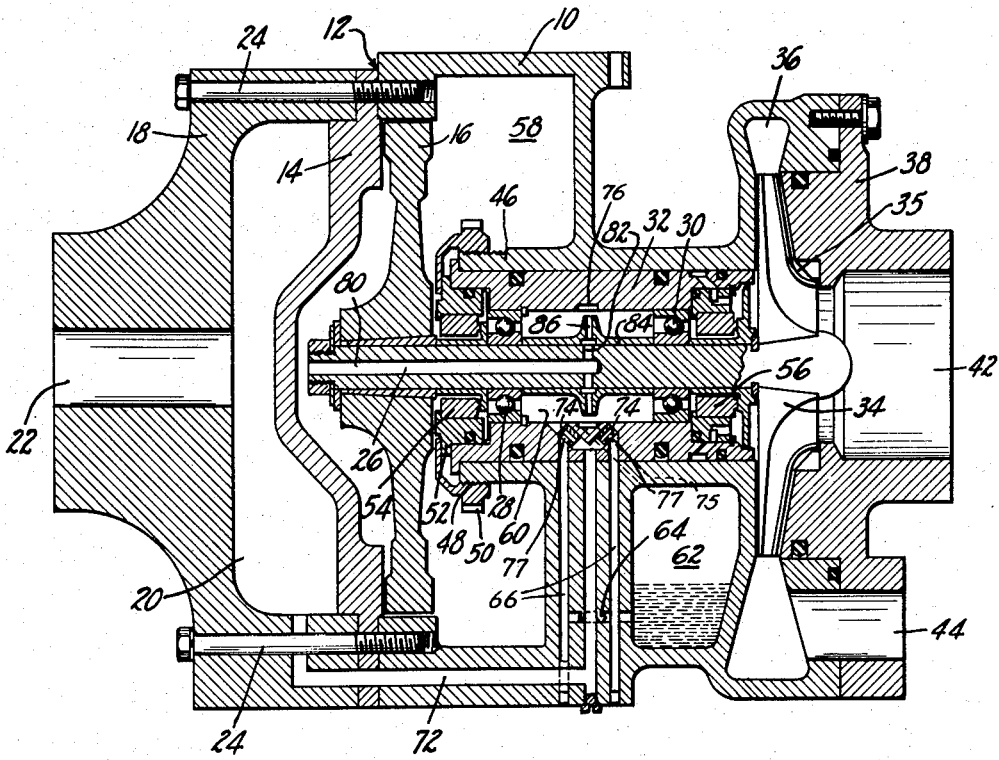
INVENTOR.
EUGENE A. SHERRILL
BY
Cecil F Arens
ATTORNEY

United States Patent Office 2,702,093
Patented Feb. 15, 1955

2,702,093

LUBRICATING SYSTEM FOR HIGH-SPEED MACHINES

Eugene A. Sherrill, South Bend, Ind., assignor to Bendix Aviation Corporation, South Bend, Ind., a corporation of Delaware Application October 21, 1949, Serial No. 122,771

9 Claims. (Cl. 184—6)

This invention relates to a lubricating system for machines having relatively high speeds.

The system herein disclosed is shown in association with an air turbine driven fuel pump which attains speeds of 10,000 to 40,000 R. P. M. The particular application is ideal since the air supply used for driving the pump can also be utilized for pressurizing the oil in the lubricating system. However, the use of the system in connection with a fuel pump is by way of example only, and it is to be strictly understood that the system may be incorporated into other apparatus with equal success.

It is an object of the invention to provide a lubricating system for use in relative high speed machinery.

It is another object of the invention to provide a lubricating system for a machine wherein the lubricant is atomized before applying to the moving parts.

The above and other objects and features of the invention will be apparent from the following description of the apparatus taken in connection with the accompanying drawing which forms a part of this specification, and in which the single figure illustrates a sectional view of a fuel pump embodying the device of my invention.

Referring now to the drawing for a detailed description of the device, the reference numeral 10 designates a housing in one end of which is located an air driven turbine 12 comprising a nozzle plate 14 and a turbine wheel 16, the latter of which is arranged contiguous the nozzle plate to receive the high velocity air therefrom which impinges upon the turbine wheel to thereby drive the same. The nozzle plate is carried at the end of the housing and is interposed therebetween and an end member 18, formed with a cavity 20, which communicates with a high pressure air supply, not shown, through a passage 22. Bolts 24, pass through the end member 18 and engage the housing 10 to securely retain the nozzle plate in position.

The turbine wheel is fixedly secured to one end of a shaft 26, which is rotatably carried in bearings 28 and 30, axially spaced apart in a sleeve element 32, mounted in the housing 10. On the opposite end of the shaft 26, from the turbine wheel 16, is suitably fastened a fuel impeller wheel 34, which revolves in a chamber 35 formed in the end of the housing opposite from the turbine wheel and discharges fuel into a volute 36. An end cover 38 forms a wall for the chamber 35, and is held in place by bolts 40 which engage the housing 10. Inlet and outlet openings 42 and 44 are formed in the cover 38 for communication with the chamber 35. Fuel is drawn in at the inlet 42 and, under the centrifugal action of the impeller wheel 34, is forced out of the outlet 44.

The sleeve element 32 is securely mounted in a cylindrically formed portion 46, of the housing 10. This cylindrical portion is threaded exteriorly at 48 to receive a retainer cap 50, which when drawn up tightly against ring member 52, holds the shaft 26 and its bearing assembly in place. Seals 54 and 56 are suitably positioned at the outer sides of bearings 28 and 30 respectively, to thereby seal chambers 58 and 35 against the passage of lubricant from chamber 60, and to seal chamber 60 from the passage of fuel from chamber 35.

The invention per se resides in the lubricating system of the machine hereinbefore described and comprises a reservoir 62, which contains lubricant for the system. The reservoir is located in the housing 10 and communicates with the chamber 60, in which bearings 28 and 30 are located, through passages 64 and 66. A conduit 72 connects restrictions 74 with the high pressure air chamber 20. Return passage 75 connects the chamber 60 with the reservoir 62 for returning the lubricant after it has served its purpose. This passage 75 terminates in an annular recess 76 located interiorly of the sleeve and substantially centralized within the chamber 60. It is a function of the restrictions 74 to increase the velocity of the air past restrictions 77 for removing the lubricant from oil reservoir 62 via passages 64 and 66, and thence atomizing the lubricant to be sprayed onto bearings 28 and 30.

After the lubricant is sprayed onto the bearings the air and lubricant are separated, with the lubricant returning to the reservoir and the air exhausting into chamber 58, which is at atmospheric pressure. For exhausting the air to chamber 58 the shaft 26 is drilled centrally at 80 and radially at 82 to thereby connect chambers 58 and 60. A centrifuge member 84 is secured on the shaft 26 and is furnished with radial passages 86 arranged in registry with the radially drilled openings 82 of the shaft.

Operation and function of the device is as follows:

Air at high pressure is admitted to chamber 20. This air passes through the nozzle plate 14 where the high pressure low velocity air is converted into low pressure high velocity air which acts on the turbine wheel in the conventional manner to thereby drive the same. This turbine wheel drives the impeller wheel 34 of the centrifugal pump.

During pump rotation the high pressure air in passage 72 flowing past restrictions 77 carries the lubricant onto the bearings 28 and 30. The lubricant is in the form of a spray or mist. That is, the high pressure air breaks the lubricant up into finely divided particles before spraying the lubricant onto the bearings. This lubricant laden air in chamber 60 tends to pass out through the openings 80, 82, and 86 to chamber 58 but is precluded from so doing by the centrifugal action of the member 84. The whirling action of the member 84 throws the particles of lubricant out into the chamber 60 but permits the escape of air, free of lubricant, to chamber 58, which is vented to atmosphere.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A system for lubricating moving parts of a machine comprising means located adjacent the moving parts for supplying lubricant mist thereto and adapted to be connected to a supply of lubricant and to a supply of air under pressure, an outlet in the system for discharging the lubricant, an outlet in the system for exhausting the air, and a centrifuge built into the machine and utilizing parts thereof and located in said last named outlet, whereby the air and lubricant from said supplies are separated, whereupon the lubricant is by-passed to said first named outlet and the air is exhausted from said last named outlet.

2. A system for lubricating moving parts of a machine comprising means located adjacent the moving parts for directing lubricant mist thereonto and adapted to be connected to a supply of lubricant and to a supply of air under pressure, an outlet for the escape of air from said system, and means for receiving and separating the lubricant from the air after said lubricant has been directed onto said moving parts, said last named means including a centrifuge constructed from parts of the machine to be lubricated and having a rotatable connection to said outlet.

3. A system for lubricating moving parts of a machine comprising an inlet passage terminating adjacent the moving parts for directing lubricant mist thereonto and adapted to be connected to a supply of lubricant and to a supply of air under pressure, an outlet passage having one end terminating adjacent said moving parts for receiving lubricant to be discharged, and a second outlet passage having one end terminating adjacent said inlet passage for receiving air to be exhausted, and a centrifuge located in said second outlet passage for separating the lubricant from the air before exhausting the latter.

4. A system for lubricating moving parts of a machine comprising a reservoir for lubricant, a chamber in which the moving parts to be lubricated are located, a passage between the reservoir and chamber, a supply of air pressure connected to said passage, a passage connecting said chamber to exhaust, a return passage between the chamber and reservoir, and a centrifuge constructed from parts of the machine to be lubricated and located in the exhaust passage for separating the lubricant from the air before exhausting the latter and returning the lubricant to said chamber.

5. A system for lubricating moving parts of a machine comprising a reservoir for lubricant, a chamber in which the moving parts to be lubricated are located, a passage connecting the reservoir to the chamber, said passage and reservoir being so related that lubricant in the passage will be at the same level as the lubricant in the reservoir, an air pressure connection in communication with the chamber, a restriction communicating the air connection with the passage above the level of the lubricant, a return passage connecting said chamber to the reservoir, a passage connecting said chamber to exhaust, and a centrifuge located in the exhaust passage at its point of termination in the chamber for separating the lubricant from the air before exhausting the latter.

6. A lubricating system for a machine provided with a shaft rotatably supported in bearings comprising means located adjacent the bearings for supplying lubricant thereto and adapted to be connected to a supply of lubricant and to a supply of air under pressure, an outlet in the system for exhausting the air, and a centrifuge carried on the periphery of said shaft and having a connection to said outlet through the shaft, whereby the air and lubricant from said supply are separated.

7. A system for lubricating moving parts of a machine comprising a reservoir for lubricant, a chamber in which the moving parts to be lubricated are located, a passage connecting the reservoir to the chamber, a source of air under pressure, a conduit connecting said source of air with said passage, aspirating means in said conduit including a restriction located above the normal level of the lubricant in said reservoir for removing lubricant from said reservoir, a return passage connecting said chamber to the reservoir, a passage connecting said chamber to exhaust, and a means for separating the lubricant from the air before exhausting the latter.

8. In a fuel pump having an air turbine driving means, a system for lubricating moving parts thereof comprising a reservoir for lubricant, means located adjacent the moving parts for supplying lubricant thereto, a conduit adapted to connect said turbine with said second mentioned means for supplying air under pressure to remove said lubricant from the reservoir, an outlet in the system for returning the lubricant to the reservoir, an outlet in the system for exhausting the air, and a means for separating the lubricant from the air before exhausting the latter.

9. A system for lubricating moving parts of a machine comprising a reservoir for lubricant, a chamber in which the moving parts to be lubricated are located, a passage connecting the reservoir to the chamber, said passage and reservoir being so related that lubricant in the passage will be at substantially the same level as the lubricant in the reservoir, a source of air under pressure, means for connecting said source of air with said chamber and with said passage, a return passage connecting said chamber to the reservoir, a passage connecting said chamber to exhaust, and means for separating the lubricant from the air before exhausting the latter.

References Cited in the file of this patent

UNITED STATES PATENTS

| | | |
|---|---|---|
| 524,318 | Gill | Aug. 14, 1894 |
| 1,967,251 | McFerren | July 24, 1934 |
| 2,308,376 | Mader | Jan. 12, 1943 |
| 2,417,747 | Flowers | Mar. 18, 1947 |
| 2,575,315 | Edwards | Nov. 13, 1951 |